US 11,522,678 B2

(12) United States Patent
Ghosh et al.

(10) Patent No.: US 11,522,678 B2
(45) Date of Patent: Dec. 6, 2022

(54) BLOCK CIPHER ENCRYPTION FOR PROCESSOR-ACCELERATOR MEMORY MAPPED INPUT/OUTPUT COMMUNICATION

(71) Applicant: Intel Corporation, Santa Clara, CA (US)

(72) Inventors: Santosh Ghosh, Hillsboro, OR (US); Luis Kida, Beaverton, OR (US); Reshma Lal, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/342,271

(22) Filed: Jun. 8, 2021

(65) Prior Publication Data

US 2022/0021517 A1  Jan. 20, 2022

(51) Int. Cl.
*H04L 29/06* (2006.01)
*G06F 21/00* (2013.01)
*H04L 9/06* (2006.01)
*H04L 9/08* (2006.01)

(52) U.S. Cl.
CPC .......... *H04L 9/0637* (2013.01); *H04L 9/0631* (2013.01); *H04L 9/0825* (2013.01)

(58) Field of Classification Search
None
See application file for complete search history.

(56) References Cited

U.S. PATENT DOCUMENTS

| | | | |
|---|---|---|---|
| 2007/0140478 A1* | 6/2007 | Komano | H04L 9/0618 380/28 |
| 2018/0300261 A1* | 10/2018 | Narayanasamy | G06F 13/16 |
| 2021/0135839 A1 | 5/2021 | Peng et al. | |
| 2021/0294889 A1* | 9/2021 | Zeh | H04L 63/12 |
| 2022/0066741 A1 | 3/2022 | Saarinen | |

OTHER PUBLICATIONS

Beaulieu, Ray, et al. "Simon and Speck: Block Ciphers for the Internet of Things", National Security Agency, Jul. 9, 2015, pp. 1-15.
Benvenuto, Christoforus Juan "Galois Field in Cryptography", May 31, 2012, pp. 1-11.

(Continued)

*Primary Examiner* — Lisa C Lewis
(74) *Attorney, Agent, or Firm* — Jaffery Watson Mendonsa & Hamilton LLP

(57) ABSTRACT

Technologies for secure data transfer of MMIO data between a processor and an accelerator. A MIMO security engine includes a first block cipher pipeline to encrypt a count using a key; a first exclusive-OR (XOR) to generate a first XOR result of the encrypted count and a length multiplied by an authentication key; a second block cipher pipeline to encrypt (count+1) using the key; a second XOR to generate a second XOR result of plaintext data and the encrypted (count+1); a plurality of Galois field multipliers (GFMs) to perform Galois field multiplication on additional authenticated data (AAD), powers of the authentication key, and ciphertext data; and a plurality of exclusive-ORs (XORs) to combine results of the GFMs and the first XOR result to generate an authentication tag. Other embodiments are described and claimed.

20 Claims, 7 Drawing Sheets

(56) References Cited

OTHER PUBLICATIONS

Bogdanov, A., et al "PRESENT: An Ultra-Lightweight Block Cipher", In: Paillier P., Verbauwhede I. (eds) Cryptographic Hardware and Embedded Systems—CHES 2007. Lecture Notes in Computer Science, vol. 4727. Springer, Berlin, Heidelberg. https://doi.org/10.1007/978-3-540-74735-2_31.
Borghoff, J. et al. "PRINCE—A Low-Latency Block Cipher for Pervasive Computing Applications". In: Wang X., Sako K. (eds) Advances in Cryptology—ASIACRYPT 2012. Lecture Notes in Computer Science, vol. 7658. Springer, Berlin, Heidelberg. https://doi.org/10.1007/978-3-642-34961-4_14.
Dworkin, Morris "Recommendation for Block Cipher Modes of Operation: Galois/Counter Mode (GCM) and GMAC" NIST Special Publication 800-38D, Nov. 2007, all pages.
Daniel J. Bernstein et al., "Gimli," retrieved from the Internet: accessed on Jul. 7, 2021, pp. 1-48.
Joan Daemen et al., "The Subterranean 2.0 Cipher Suite," Mar. 29, 2019, 29 pages, Version 1.1, Radboud University, Digital Security Department, Nijmegen.
Joan Daemen et al., "Xoodoo Cookbook," Mar. 14, 2019, 32 pages, STMicroelectronics & Radboud University.
Morris Dworkin, "SHA-3 Standard: Permutation-Based Hash and Extendable-Output Functions," Aug. 2015, 37 pages, FIPS Pub 202.
Non-Final Office Action, U.S. Appl. No. 17/342,267, dated Jun. 9, 2022, 19 pages, USPTO.

* cited by examiner

BLOCK CIPHER ENCRYPTION FOR PROCESSOR-ACCELERATOR MEMORY MAPPED INPUT/OUTPUT COMMUNICATION

BACKGROUND

In some cloud and high-volume data analytics computing environments, compute intensive workloads are often offloaded from processors to accelerators to achieve higher performance. Security in such processor-accelerator communication is a critical requirement; otherwise, important information might be leaked or spoofed during this communication that might cause an incorrect data analytic result, loss of privacy of the data, or loss of intellectual property (IP). Applications with security requirements want to benefit from heterogeneous computing resources in cloud computing environments without any loss in security or privacy. Use of encryption to protect the communication between a trusted execution environment (TEE) in the processor and the accelerator, thereby providing privacy, integrity, and anti-replay protection, is a possible solution but encryption consumes scarce system resources and may add performance overhead. Existing solutions based on Advanced Encryption Standard (AES)-Galois/Counter Mode (GCM) encryption require a large circuit area and a large power budget that limit widespread use, especially for applications using a large hardware kernel.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
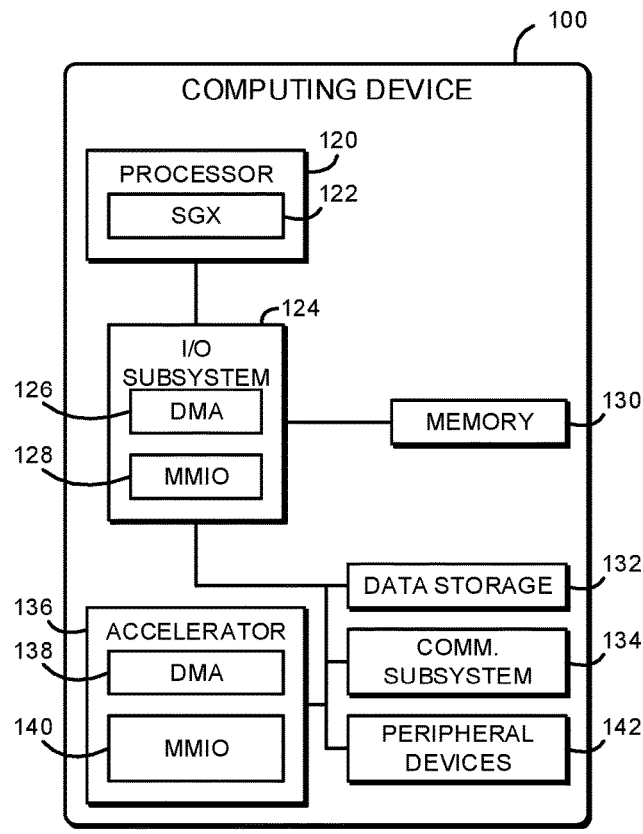
FIG. 1 is a block diagram of a computing device according to one or more embodiments.

The technology described herein provides a low circuit area, low power, low latency, and high throughput cryptographic design for protecting MMIO communications between a processor and an accelerator against information leakage, spoofing, slicing, and denial of service (DoS) attacks. The reduced circuit area and reduced power requirements of this technology allows implementation of cryptographic operations with a reduced size of a sequestered portion of the accelerator from the user's memory space. The technology protects in-line data during transfer between the processor and the accelerator without requiring buffering prior to processing and without stalling data transfers. This technology also provides security without any performance overhead on existing unsecured MMIO transfers.

The technology described herein is based on a lightweight block-cipher based Galois counter authentication technique. In some embodiments, the block cipher operates on 64-bit data blocks. In one implementation using a PRINCE block cipher (as disclosed in "PRINCE—A Low Latency Block Cipher for Pervasive Computer Applications," by Julia Borghoff, et. al.), this technology uses approximately 25% of the area and provides 2.5× lower latency compared to an existing AES-GCM based technique.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for low area, low power, low latency and high throughput cryptography processing for processor-accelerator communication includes a processor 120 and an accelerator device 136. Accelerator 136 includes one or more hardware implemented security engines, illustratively a direct memory access (DMA) security engine 138 and a MMIO security engine 140. In at least one embodiment, accelerator 136 is implemented as a field programmable gate array (FPGA). In use, as described further below, computing device 100 initializes security engines 138, 140, which pre-fills cryptographic pipelines and pre-computes counter values, hash subkeys, and other values. DMA security engine 138 protects DMA transactions. MMIO security engine 140 protects MMIO transactions. After initialization is complete, computing device 100 generates DMA or MMIO transactions between processor 120 and accelerator 136, and the respective security engines 138, 140 perform authenticated cryptographic operations (e.g., authenticated encryption or authenticated decryption) on the transferred data in-line. A block of multiple DMA and/or MMIO transactions may be protected without re-initialization of security engines 138, 140. As described further below, security engines 138, 140 perform cryptographic operations with low latency (e.g., 1-2 clock cycles) and high bandwidth, and without the need to buffer data prior to processing or to stall the data transfers. Accordingly, computing device 100 provides security without incurring significant additional overhead for data streamed between processor 120 and accelerator 136 as compared to existing, unsecured communications. Additionally, as described further below, computing device 100 provides protection against certain denial of service (DoS) attacks.

Computing device 100 may be embodied as any type of device capable of performing the functions described herein. For example, computing device 100 may be implemented as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes processor 120, input/output (I/O) subsystem 124, memory 130, and data storage device 132. Additionally, in some embodiments, one or more of the illustrative components may be incorporated in, or otherwise form a portion of, another component. For example, memory 130, or portions thereof, may be incorporated in processor 120 in some embodiments.

Processor 120 may be embodied as any type of processor capable of performing the functions described herein. For example, processor 120 may be embodied as a single or multi-core processor(s), digital signal processor, microcontroller, or other processor or processing/controlling circuit. As shown, processor 120 illustratively includes secure enclave support 122, which allows processor 120 to establish a trusted execution environment (TEE) known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of processor 120 while being executed or while being stored in certain protected cache memory of the processor. The code and data included in the secure enclave is encrypted when stored in a shared cache or main memory 130. Secure enclave support 122 is embodied as a set of processor instruction extensions that allows the processor to establish one or more secure enclaves in the memory 130. For example, in one embodiment the secure enclave support 122 is embodied as Intel® Software Guard Extensions (SGX) technology.

Memory 130 may be embodied as any type of volatile or non-volatile memory or data storage capable of performing the functions described herein. In operation, the memory 130 stores various data and software used during operation of computing device 100 such as operating systems, applications, programs, libraries, and drivers. As shown, memory 130 is communicatively coupled to the processor 120 via I/O subsystem 124, which is implemented as circuitry and/or components to facilitate input/output operations with processor 120, memory 130, and other components of the computing device. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations.

As shown, I/O subsystem 124 includes DMA security engine 126 and MMIO security engine 128. Processor 120, including secure enclaves established with secure enclave support 122, communicates with the accelerator using one or more DMA transactions using DMA security engine 126 and/or using one or more MMIO transactions using MMIO security engine 128. As described further below, the transactions are cryptographically protected using corresponding security engines 138, 140 of accelerator 136. Computing device 100 may include multiple DMA security engines 126 and/or MMIO security engines 128 for handling DMA and MMIO transactions, respectively, based on desired bandwidth between processor 120 and accelerator 136. Although illustrated as being included in I/O subsystem 124, it should be understood that in some embodiments DMA security engine 126 and/or the MMIO security engine 128 are included in other components of the computing device (e.g., processor 120, memory controller, or system agent), or in some embodiments are implemented as separate components. Thus, in some embodiments, memory 130 may be directly coupled to processor 120, for example via an integrated memory controller hub. Additionally, in some embodiments, I/O subsystem 124 forms a portion of a system-on-a-chip (SoC) and is incorporated, along with processor 120, memory 130, accelerator 136, and/or other components of the computing device, on a single integrated circuit chip. Additionally or alternatively, in some embodiments processor 120 includes an integrated memory controller and a system agent, which may be embodied as a logic block in which data traffic from processor cores and I/O devices converges before being sent to memory 130.

Data storage device 132 may be embodied as any type of device or devices configured for short-term or long-term storage of data such as, for example, memory devices and circuits, memory cards, hard disk drives, solid-state drives, non-volatile flash memory, or other data storage devices. Computing device 100 may also include communications subsystem 134, which may be implemented as any communication circuit, device, or collection thereof, capable of enabling communications between computing device 100 and other remote devices over a computer network (not shown). Communications subsystem 134 may be configured to use any one or more communication technology (e.g., wired or wireless communications) and associated protocols (e.g., Ethernet, Bluetooth®, WiMAX, 3G, 4G LTE, etc.) to implement such communication.

Accelerator 136 may be embodied as a FPGA, an application-specific integrated circuit (ASIC), a coprocessor, or other digital logic device capable of performing accelerated functions (e.g., accelerated application functions, accelerated network functions, or other accelerated functions). Illustratively, accelerator 136 is an FPGA, which is embodied as an integrated circuit including programmable digital logic resources that may be configured after manufacture. The FPGA may include, for example, a configurable array of logic blocks in communication over a configurable data interchange. Accelerator 136 may be coupled to the processor 120 via a high-speed connection interface such as a peripheral bus (e.g., a PCI Express bus) or an inter-processor interconnect (e.g., an in-die interconnect (IDI) or QuickPath Interconnect (QPI)), or via any other appropriate interconnect. Accelerator 136 receives data and/or commands for processing from processor 120 and return results data to the processor via DMA, MMIO, or other data transfers.

As shown, accelerator 136 includes DMA security engine 138 and secure MMIO security engine 140. As described further below, the security engines perform in-line authenticated cryptographic operations on data transferred between processor 120 and accelerator 136. Although illustrated as being included in accelerator 136, it should be understood that in some embodiments security engines 138, 140 are included in other components of the computing device, or in some embodiments may be implemented as separate components.

As shown, computing device 100 further includes one or more peripheral devices 142. Peripheral devices 142 may include any number of additional input/output devices, interface devices, hardware accelerators, and/or other peripheral devices. For example, in some embodiments, peripheral devices 142 include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 2:
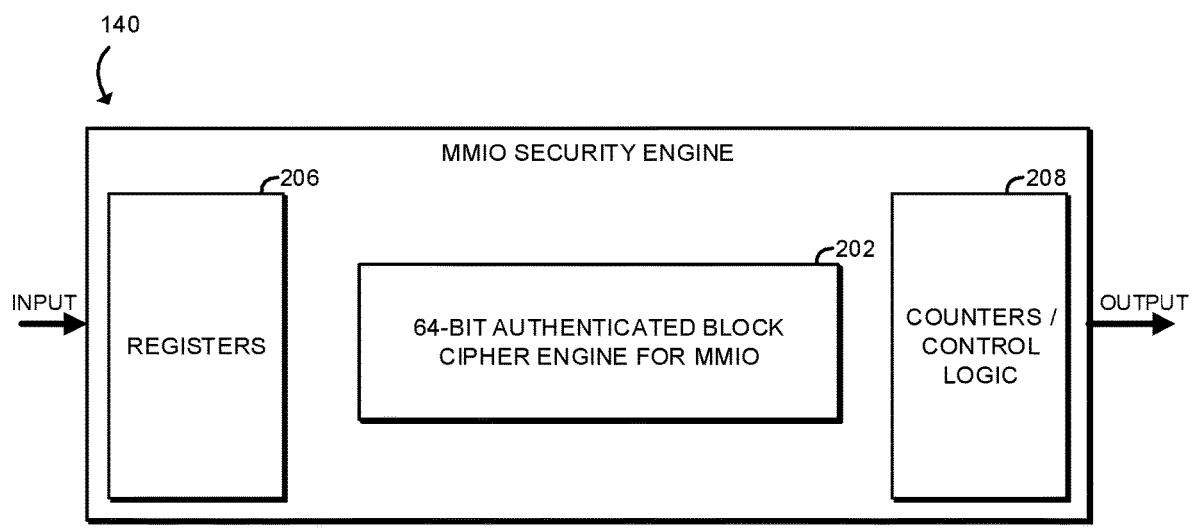
FIG. 2 is a block diagram of a memory-mapped input/output (I/O) (MMIO) security engine of the computing device according to one or more embodiments.

Referring now to FIG. 2, an illustrative embodiment of MMIO security engine 140 is shown. MMIO security engine 140 includes 64-bit authenticated block cipher engine for MIMO 202. The 64-bit authenticated block cipher engine for MIMO 202 is embodied as digital logic resources that perform block cipher encryption. As shown, MMIO security engine 140 also includes registers 206 and counters/control logic 208. MMIO security engine 140 receives input data and generates output data. The input data and output data are embodied as blocks of binary data. MMIO security engine 140 also receives and/or asserts other data signals, including additional authentication data (AAD), authentication tags (ATs), encryption keys, control signals, and/or other signals.

The particular number and/or arrangement of components of MMIO security engine 140 may scale depending on the type of data transfer and/or the amount of data processed per transaction. For MMIO transfers, after the setup phase, MMIO security engine 140 is ready for data transfers and produces encrypted/decrypted output in the next clock cycle of a valid input (e.g., plaintext to ciphertext latency is 1 clock cycle and ciphertext to plaintext latency is 1 clock cycle). MMIO security engine 140 continually streams out encrypted/decrypted data in each clock cycle. MMIO security engine 140 processes 64 bits of data per transaction (e.g., per clock cycle).

Figure 3:
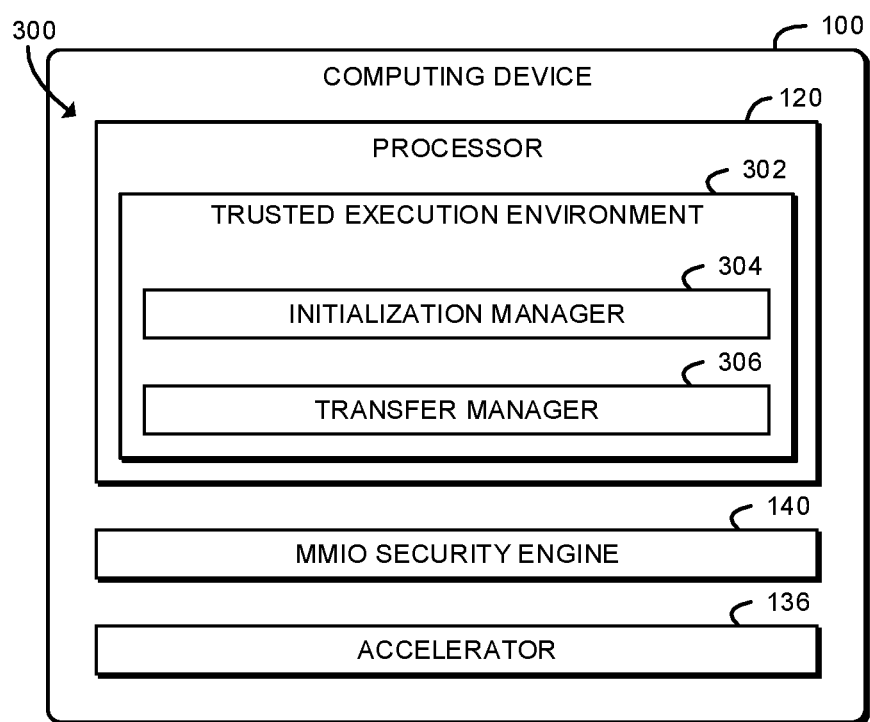
FIG. 3 is a block diagram of a computing environment of the computing device according to one or more embodiments.

Referring now to FIG. 3, in an illustrative embodiment, computing device 100 establishes a computing environment 300 during operation. The illustrative environment 300 includes trusted execution environment (TEE) 302, initialization manager 304, transfer manager 306, and MIMO security engine 140. The various components of environment 300 may be embodied as hardware, firmware, software, or a combination thereof. As such, in some embodiments, one or more of the components of environment 300 are embodied as circuitry or a collection of electrical devices (e.g., trusted execution environment circuitry 302, initialization manager circuitry 304, transfer manager circuitry 306, and/or MIMO security engine circuitry 140). It should be appreciated that, in such embodiments, one or more of trusted execution environment circuitry 302, initialization manager circuitry 304, transfer manager circuitry 306, and/or MIMO security engine circuitry 140 form a portion of processor 120, I/O subsystem 124, accelerator device 136, and/or other components of computing device 100. Additionally, in some embodiments, one or more of the illustrative components form a portion of another component and/or one or more of the illustrative components are independent of one another.

Trusted execution environment 302 may be embodied as any trusted execution environment of computing device 100 that is authenticated and protected from unauthorized access using hardware support of computing device 100, such as secure enclave support 122 of processor 120. Illustratively, trusted execution environment 302 is a secure enclave established using Intel SGX technology. As shown, trusted execution environment 302 includes initialization manager 302 and transfer manager 306. In some embodiments, initialization manager 302 and the transfer manager 306 are included in separate trusted environments (e.g., separate enclaves).

Initialization manager 304 is configured to initialize MIMO security engine 140 with an initialization vector (IV) and a secret key. The IV and the secret key may be provided by trusted execution environment 302. Initializing MIMO security engine 140 includes asserting a start signal to the MIMO security engine and inserting a zero block into 64-bit block cipher engine for MMIO 202 in response to receiving the start signal. The zero block may be embodied as a 64-bit block with each bit equal to zero. Initializing MIMO security engine 140 further includes deriving, by MIMO security engine 140, one or more hash subkeys as a function of an output of 64-bit block cipher engine for MMIO 202 in response to inserting the zero block. Initializing MIMO security engine 140 further includes initializing an initial counter block as a function of the IV in response to receiving the start signal, inserting a counter block based on the initial counter block into one or more portions of 64-bit block cipher engine for MMIO 202, executing a predetermined number of block cipher rounds (e.g., 12 rounds) with the 64-bit block cipher engine for MMIO in response to inserting the counter blocks, and asserting a ready signal by MIMO security engine 140 in response to executing the predetermined number of block cipher rounds.

Transfer manager 306 is configured to initiate a data transfer operation between trusted execution environment 302 and accelerator 136 in response to initializing the MIMO security engine. In some embodiments, the data transfer operation is a MMIO transaction with a single input data block. For MMIO transactions, transfer manager 306 may be further configured to calculate, by trusted execution environment 302, an expected authentication tag (AT) value for the data transfer operation and to write, by trusted execution environment 302, the expected authentication tag value to MIMO security engine 140.

MIMO security engine 140 is configured to perform an authenticated cryptographic operation for the data transfer operation in response to initiating the data transfer operation. The authenticated cryptographic operation may be embodied as a 64-bit block cipher cryptographic operation including authenticated encryption or authenticated decryption.

For MMIO operations, performing the authenticated cryptographic operation includes performing a cryptographic operation with a 64-bit block cipher engine for MMIO 202 on the input data block to generate an output data block and generating a final authentication tag value based on a ciphertext block (e.g., the input data block for decryption or the output data block for encryption). MIMO security engine 140 compares the final authentication tag value to an expected authentication tag value written by the trusted execution environment 302.

As used herein, the initialization vector (IV) is a nonce value associated with a particular block of MMIO transactions. The secret key is any symmetric encryption key used to protect data transferred between processor 120 and accelerator 136. In an embodiment, the secret key comprises at least 128 bits. The additional authenticated data (AAD) comprises any addressing data, metadata, or other data related to a MMIO transaction that will be authenticated but not encrypted by MMIO security engine 140. The authentication key H is 128 bits. The count is derived from the IV as described below. The keystream is the output data from performing 64-bit block cipher pipeline 2 406 described below on (count+1) and the secret key. The length is a 64-bit number used to represent the size of the AAD and plaintext/ciphertext data. The authentication tag is 64 bits.

MMIO communication between processor 120 and accelerator 136 carries either 32-bit data or 64-bit data with up to 128-bits of additional authenticated data (AAD). Confidentiality and integrity protections are provided to each MMIO transaction independently. There might be independent MMIO transactions in consecutive cycles. This requires an encryption and authentication tag computation technique with just one cycle latency that can accommodate up to 64-bit data with 128-bit AAD and compute the corresponding authentication tag. In an embodiment, the encryption and authentication tag computation technique comprise a 64-bit block cipher and a Galois counter authentication scheme.

Embodiments of 64-bit block cipher engine for MMIO 202 take an IV and a key as input when the start of the engine is asserted. An associated authentication key H, and H to the power of 2, 3, and 4 are computed, as well as the value of length×H, where for MMIO transactions 64-bit length the H variable has two parts, the higher 32 bits represents the size in bits of the MMIO data block and the lower 32 bits carries the size in bits of the AAD. For example, for an MMIO configuration with a 128-bit AAD and 64-bit message/data, the length=0x0000004000000080. The keystream that will be XORed with the (plaintext or ciphertext) data is also computed. With these precomputations, the 64-bit block cipher engine for MMIO will be ready to capture data in each cycle.

The technique described herein can be built with any 64-bit block cipher. Once the 64-bit block cipher engine for MMIO 202 is ready, the latency of the authentication tag computation is the ultimate latency added from data input to output. This latency includes the latency of the 64-bit Galois field multipliers (2 cycles)+4 XORs, which results in 3 cycles latency from data input to data output.

In one embodiment, 64-bit block cipher engine for MMIO 202 is implemented with at least three Galois field multipliers (GFMs) and two 64-bit block cipher pipelines to support throughput up to a 64-bit MMIO message transfer in each clock cycle. This allows the 64-bit block cipher engine for MMIO to have throughput with inline bus speed without any buffering. The 64-bit block cipher engine for MMIO supports up to 128-bit AAD (e.g., metadata). If a longer AAD is desired, then additional GFMs can be incorporated in the 64-bit block cipher engine for MIMO to maintain the same throughput.

In one embodiment, a PRINCE block cipher is implemented with a depth-4 pipeline whereas the 64-bit Galois field multipliers are implemented with a depth-2 pipeline. The initial setup of the 64-bit block cipher engine takes 8 cycles. Note that by keeping the same multiplier the PRINCE block cipher engine can be replaced in other embodiments by other alternatives such as those described in: "SIMON and SPECK: Block Ciphers for the Internet of Things" by Ray Beauleu, et al., National Security Agency, Jul. 9, 2015; "PRESENT: An Ultra-Lightweight Block Cipher" by A. Bogdanov, et al., 2007, or other suitable block ciphers. Based on the block cipher used, the initial latency will be different, but the authentication tag computation remains unchanged.

In one embodiment, the authentication tag is computed in Equation 1 as:

$$Tag=(AAD_{128\text{-}64} \times H^4) \bigcirc (AAD_{63\text{-}0} \times H^3) \bigcirc (\text{Ciphertext\_data} \times H^2) \bigcirc (\text{Length} \times H)) \bigcirc E_k(\text{Count}),$$

where the 128-bit AAD is sub-divided into two parts ($AAD_{128\text{-}64}$ and $AAD_{63\text{-}0}$), and the authentication key H is precomputed using one of the block cipher pipelines ($H=E_k$ (64-bit 0)) during setup time. Similarly, the values of $H^2$, $H^3$ and $H^4$ are precomputed using GFMs.

A 32-bit IV is the input data for the 64-bit block cipher engine for MMIO 202 and the block cipher engine forms the 64-bit initial Count value as:

Count=16-bit all-0||32-bit IV||14-bit all-0||12-bit "01"
Count+1=16-bit all-0||32-bit IV||14-bit all-0||12-bit "10"

These two values are processed through two block cipher pipelines. The Count for each new data processing is updated as follows:

Count=(Count$_{63:16}$+1-bit "1")|| Count$_{15:0}$ In other words, in this update, the IV is incremented by 1.

Figure 4:
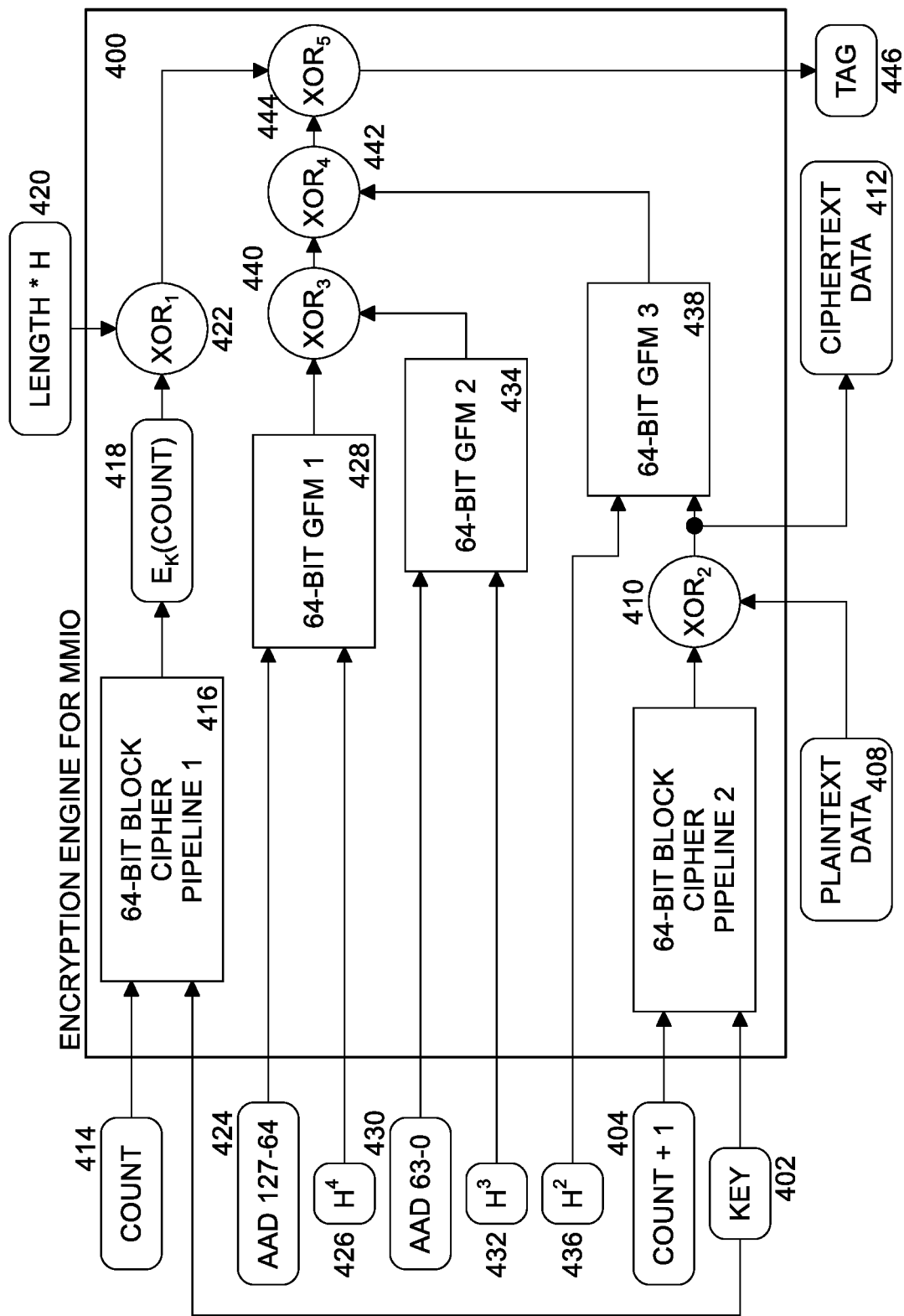
FIG. 4 is a block diagram of an encryption engine according to one or more embodiments.

FIG. 4 is a block diagram of an encryption engine 400 according to one or more embodiments. In one embodiment, encryption engine 400 is an implementation of 64-bit block cipher engine for MMIO 202 of FIG. 2. FIG. 4 shows the encryption engine 400 that provides for encryption of one 64-bit plaintext data 408 with an associated 64-bit authentication tag 446 in each clock cycle. Plaintext data 408 is input to XOR$_2$ 410 along with the output of 64-bit block cipher pipeline 2 406 (e.g., an implementation of a PRINCE block cipher or other suitable block cipher) which operates on key 402 and count+1 404 to produce ciphertext data 412.

Other components shown for 64-bit block cipher engine for MMIO 202 are used to generate the authentication tag 446. Count 414 and key 402 are input to 64-bit block cipher pipeline 1 416 (e.g., an implementation of a PRINCE block cipher or other suitable block cipher) to produce encrypted count $E_K$(Count) 418. The encrypted count $E_K$(Count) 418 is input to XOR$_1$ 422 with the length*H 420. AAD$_{127\text{-}64}$ 424 and $H^4$ 426 are input to 64-bit GFM 1 428 and the result of processing by 64-bit GFM 1 428 is input to XOR$_3$ 440. AAD$_{63\text{-}0}$ 430 and $H^3$ 432 are input to 64-bit GFM 2 434 and the result of processing by 64-bit GFM 2 434 is input to XOR$_3$ 440 along with the output of 64-bit GFM 1 428. $H^2$ 436 is input to 64-bit GFM 3 438 with ciphertext data 412 and the result of processing by 64-bit GFM 3 438 is input to XOR$_4$ 442 along with the output of XOR$_3$ 440. The output of XOR$_4$ 422 and XOR$_4$ 442 is input to XOR$_5$ 444. The output of XOR$_5$ 444 is tag 446. Ciphertext data 412 and tag 446 are communicated to a receiving device (e.g., either processor 120 or accelerator 136). The count is incremented for processing of the next 64-bit data in the next clock cycle.

Figure 5:
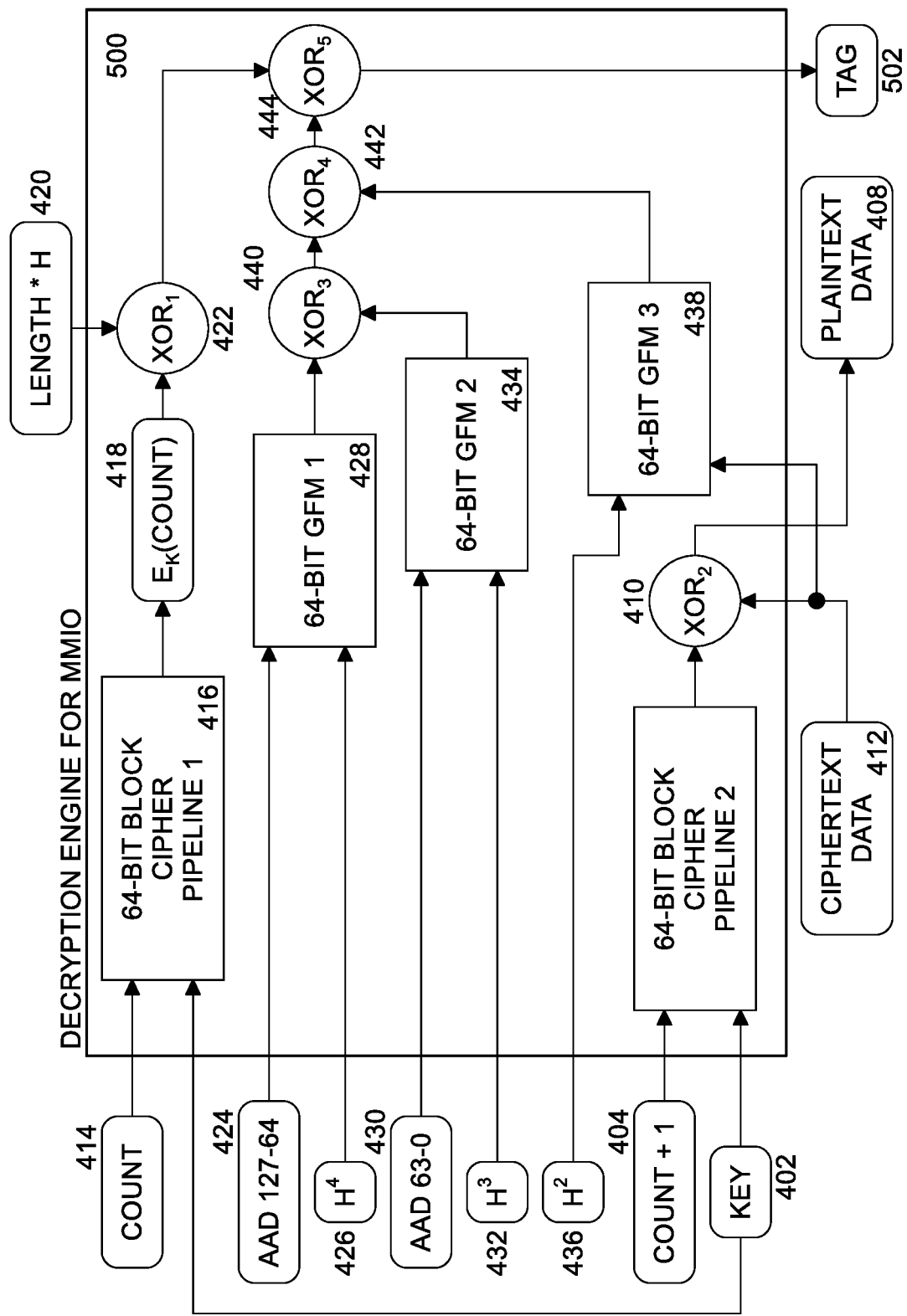
FIG. 5 is a block diagram of a decryption engine according to one or more embodiments.

FIG. 5 is a block diagram of a decryption engine 500 according to one or more embodiments. In one embodiment, decryption engine 500 is an implementation of 64-bit block cipher engine for MMIO 202 of FIG. 2. FIG. 5 shows the decryption engine 500 that provides for decryption of one 64-bit data 408 with an associated 64-bit authentication tag 502 in each clock cycle. Ciphertext data 412 is input to XOR$_2$ 410 along with the output of 64-bit block cipher pipeline 2 406 (e.g., an implementation of a PRINCE block cipher or other suitable block cipher) which operates on key 402 and count+1 404 to produce plaintext data 408. Other components shown for 64-bit block cipher engine for MMIO 202 are used to generate the authentication tag 502 in processing similar to that described above in FIG. 4.

Additionally, to provide minimal performance overhead, 64-bit block cipher engine for MMIO 202 engines include the following features. Embodiments provide for in-line encryption: data is processed as the data is transferred. There is no need to buffer data for processing nor to stall transfers to allow for data processing. Embodiments provide for initial latency to be hidden during setup processing: the keystream and the authentication key (H) are derived inside the engine from the secret key and the IV before starting the data transfer so the sending and receiving devices do not perceive the setup clocks as extra latency during data transfer. In one embodiment, the setup takes 8 cycles for a 64-bit Prince-GCM implementation. Embodiments provide for generation of an on-time authentication tag: MMIO transactions that must be validated in each transaction transfer a small amount of data before execution. For a Prince-GCM implementation, the final tag= $(AAD_{h64}*H^4 \oplus AAD_{L64}*H^3 \oplus d*H^2 \oplus Length*H) \oplus E$ (count) is computed on each individual AAD and data in each cycle.

Figure 6:
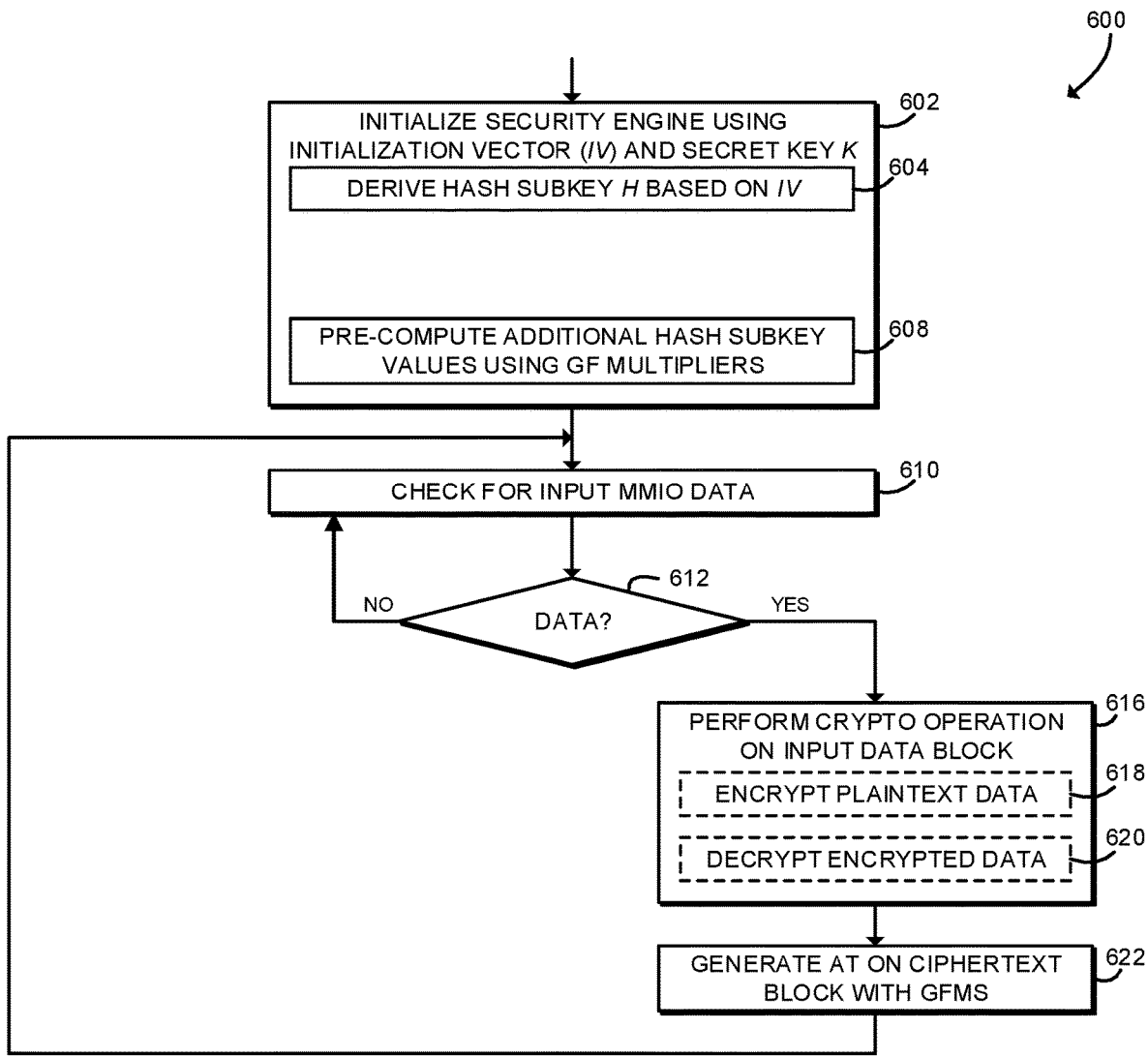
FIG. 6 is a flow diagram of cryptography processing for processor-accelerator communication according to one or more embodiments.

Referring now to FIG. 6, in use, in one embodiment computing device 100 executes method 600 for low-latency cryptography processing for processor-accelerator communication for a block of MMIO transactions. It should be appreciated that, in some embodiments, the operations of method 600 are performed by one or more components of computing environment 300 of computing device 100 as shown in FIG. 3. The method begins in block 602, in which computing device 100 initializes MIMO security engine 140 using an initialization vector IV and a secret key K. The IV is a nonce value associated with a particular block of MMIO transactions. MIMO security engine 140 may be initialized, for example, in response to a signal from processor 120 caused by trusted execution environment 302.

The value for IV may be determined according to one or more AES-GCM specifications. The secret key K may be embodied as any symmetric encryption key used to protect data transferred between the processor 120 and the accelerator 136. During initialization, MIMO security engine 140 pre-computes values, primes encryption pipelines, and otherwise prepares to process data transfers. Initializing the MIMO security engine may hide pipeline latency or other latency associated with the MIMO security engine 140. In one embodiment, initialization may require 14 clock cycles for MMIO. In block 604, MIMO security engine 140 derives a hash subkey H (authentication key) based on IV. The hash subkey H is derived from the secret key K 402 by encrypting a block with all bits set to zero. In block 608, MIMO security engine 140 pre-computes additional hash subkey values using one or more GFMs 428, 434, 438. For example, MIMO security engine 140 may compute $H^2=H \cdot H$, $H^3=H \cdot H \cdot H$, and so on, where the symbol·denotes Galois field multiplication.

In block 610, MIMO security engine 140 checks for input MMIO data. The MMIO data may be embodied as 32 bits or 64 bits of data. In block 612, MIMO security engine 140 determines whether input data has been received. If so, the method branches to block 616, described below. If no input data was received, the method loops back to block 610 to continue checking for input MMIO data.

At block 616, MIMO security engine 140 performs a cryptographic operation on the input data block. In some embodiments, in block 618 the MIMO security engine 140 encrypts the input data. For example, the MIMO security engine encrypts plaintext data received from accelerator 136 before the data is transferred to processor 120, as in an MMIO read response. In some embodiments, in block 620 the MIMO security engine 200 decrypts the input data. For example, the MIMO security engine 140 decrypts ciphertext data received from processor 120 before the data is transferred to accelerator 136, as in an MMIO write.

In block 622, MIMO security engine 140 generates an authentication tag (AT) 446 based on the ciphertext (encrypted) block(s). The ciphertext blocks are the input data to MIMO security engine 140 (e.g., for decryption operations) or the output data from the MIMO security engine (e.g., for encryption operations). The AT is generated using multiple GFMs 428, 434, 438 based on the ciphertext and one or more other values (e.g., hash subkeys H, $H^2$, $H^3$, additional authenticated data (AAD), etc.). As described further below, the AT is used by processor 120 and/or accelerator 136 to verify that an MMIO transaction was authentic and unaltered. After performing the cryptography operation and the authentication operation, the method 600 loops back to block 610 to continue monitoring for input MMIO data.

Figure 7:
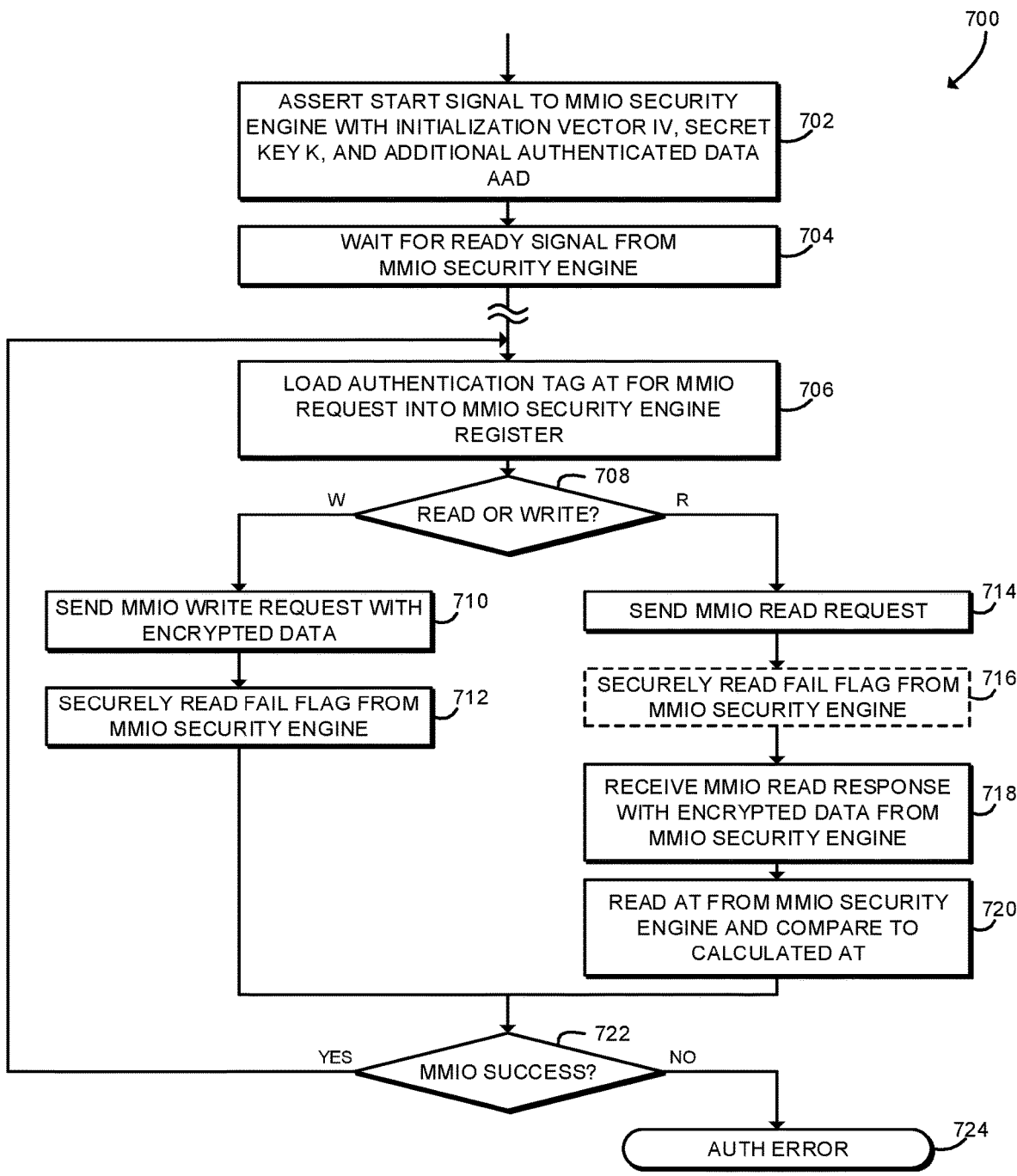
FIG. 7 is a flow diagram of MMIO transfer management processing according to one or more embodiments.

Referring now to FIG. 7, in use, in one embodiment computing device 100 executes a method 700 for MMIO transaction block management. It should be appreciated that, in some embodiments, the operations of the method 700 are performed by one or more components of computing environment 300 of computing device 100 as shown in FIG. 3, such as trusted execution environment 302. The method 700 begins in block 702, in which processor 120 asserts a start signal to MMIO security engine 140. The processor provides the initialization vector IV, secret key K 402, and additional authenticated data (AAD) to MMIO security engine 140. The processor may use any technique to security communicate that data to MMIO security engine 140. As described above, IV is a nonce value associated with a block of MMIO transactions and is started with a random 32-bit input to the engine and is updated for each MMIO transaction (based on Count=(Count$_{63:16}$+1-bit "1")||Count$_{15:0}$). The secret key K is embodied as any symmetric encryption key used to protect data transferred between processor 120 and accelerator 136. The key K may be protected from unauthorized disclosure by trusted execution environment 302, for example by being maintained in a secure enclave established using secure enclave support 122 of processor 120. The AAD is any addressing data, metadata, or other data related to the MMIO transaction that will be authenticated but not encrypted by MMIO security engine 140. In response to the start signal, the MMIO security engine performs an initialization process as described above.

In block 704, processor 120 waits for a ready for data signal to be asserted by the MMIO security engine 140. As described above, the ready for data signal is asserted when the MMIO security engine 140 completes its initialization process. Processor 120 may poll, wait for an interrupt, or otherwise monitor for the ready for data signal. After the ready for data signal is asserted, the method 700 proceeds to block 706.

In block 706, the processor loads an expected value of the authentication tag (AT) for an MMIO request into a register 206 of MMIO security engine 140. The MMIO request is an MMIO write request or an MMIO read request. The AT is determined by the processor, for example, by trusted execution environment 302, based on 64-bit block cipher engine for MMIO 202. The expected AT depends upon the ciphertext and additional authenticated data (AAD) of the MMIO request. If the ciphertext is not known ahead of time, for example for MMIO read requests, the authentication AT is based on AAD with no ciphertext (e.g., ciphertext of length zero) or with a predetermined constant ciphertext or other known value of ciphertext (e.g., a zero block). As described further below, MMIO read responses are generated by accelerator 136, and thus the processor does not predetermine an AT for MMIO read responses.

In block 708, method 700 switches based on whether the MMIO request is an MMIO write request or an MMIO read request. If the MMIO request is a read request, the method branches to block 714, described below. If the MMIO request is a write request, the method branches to block 710.

In block 710, the processor sends an MMIO write request to MMIO security engine 140, including ciphertext data to be written to accelerator 136. As described further below, the ciphertext data is decrypted by MMIO security engine 140 and transferred to accelerator 136. The MMIO write request is issued by processor 120 using MMIO security engine 128 or other components of the processor or SoC. MMIO requests are performed with small (e.g., 64-bit) payloads, and there may be an MMIO request every clock cycle that requires confidentiality and integrity protection. The execution of an MMIO transaction is conditional on the integrity of the MMIO transaction request. The MMIO request includes an address in MMIO space, encrypted data, or other data associated with the MMIO request.

In block 712, the processor securely reads a fail flag from MMIO security engine 140. As described further below, for MMIO write requests the MMIO security engine calculates a final AT value and compares the final AT value to the expected AT value provided by the processor in connection with block 706. If the final AT value and the expected AT value do not match, then secure MMIO security engine 140 sets the fail flag. After reading the fail flag, the method advances to block 722.

In block 722, the processor checks whether the MMIO write request was successfully performed (e.g., whether or not the fail flag was set). If the write was not successful, method 700 branches to block 724, in which the processor indicates an authentication error. Referring back to block 722, if the MMIO write request was successfully performed, the method loops back to block 706, in which the processor may perform additional MMIO requests.

Referring back to block 708, if the MMIO request is a read request, the method branches to block 714, in which the processor sends an MMIO read request. The MMIO read request may be issued by processor 120 using the MMIO security engine 128 or other components of the processor or SoC. As described above, MMIO requests are typically performed with small (e.g., 64-bit) payloads, and there may be an MMIO request every clock cycle that requires confidentiality and integrity protection. The execution of the MMIO transaction is conditional on the integrity of the MMIO transaction request. The MMIO read request includes an address in MMIO space or other data associated with the MMIO read request.

In some embodiments, in block 716, the processor securely reads a fail flag from the MMIO security engine 140. As described further below, for MMIO read requests the MMIO security engine 140 calculates a final AT value and compares the final AT value to the expected AT value provided by the processor in connection with block 706. If the final AT value and the expected AT value do not match, then the MMIO security engine 140 sets the fail flag.

In block 718 the processor may receive an MMIO read response with ciphertext data from the MMIO security engine 140. The ciphertext data is generated by the MMIO security engine 140, which reads plaintext data from the accelerator. In some embodiments, the MMIO read response is received only if the MMIO read request was successful. Additionally or alternatively, in some embodiments an arbitrary MMIO read response is returned if the MMIO read request was not successful. Additionally or alternatively, in some embodiments a poisoned MMIO read response is returned if the MMIO read request was not successful. The poisoned response and AT are calculated to guarantee the AT generated by the MMIO security engine 140 mismatches the AT calculated by the processor on the poisoned response. Additionally or alternatively, although illustrated as being performed by the same MMIO security engine 140, in some embodiments, a different MMIO security engine 140 processes MMIO transactions in each direction. For example, two different MMIO security engines 140 process MMIO requests (read requests and write requests) and MMIO read responses, respectively.

In block 720 the processor reads a final AT value from the MMIO security engine 140 and compares that value to an AT value for the MMIO read response calculated by the processor. The calculated AT value is determined by processor 120 based on the ciphertext received in the MMIO read response. If the final AT value matches the calculated AT value, then the MMIO read response was performed successfully. If the final AT value does not match the calculated AT value, then either the MMIO read response was not performed successfully or the MMIO read request was not performed successfully. For example, as described further below, if the MMIO read request is not successful, the MMIO security engine 140 returns an arbitrary MMIO read response and a poisoned AT value that does not match the MMIO read response.

In block 722 processor 120 checks whether the MMIO read request was successfully performed. For example, the processor determines whether or not the fail flag was set after sending the MMIO read request and/or the processor determines whether the AT received from the MMIO security engine 140 matches the calculated AT for the MMIO read response. If the MMIO read request was not successful, the method 700 branches to block 724, in which the processor indicates an authentication (AUTH) error. Referring back to block 722, if the MMIO read request was successfully performed, the method loops back to block 706, in which the processor may perform additional MMIO requests.

Figure 8:
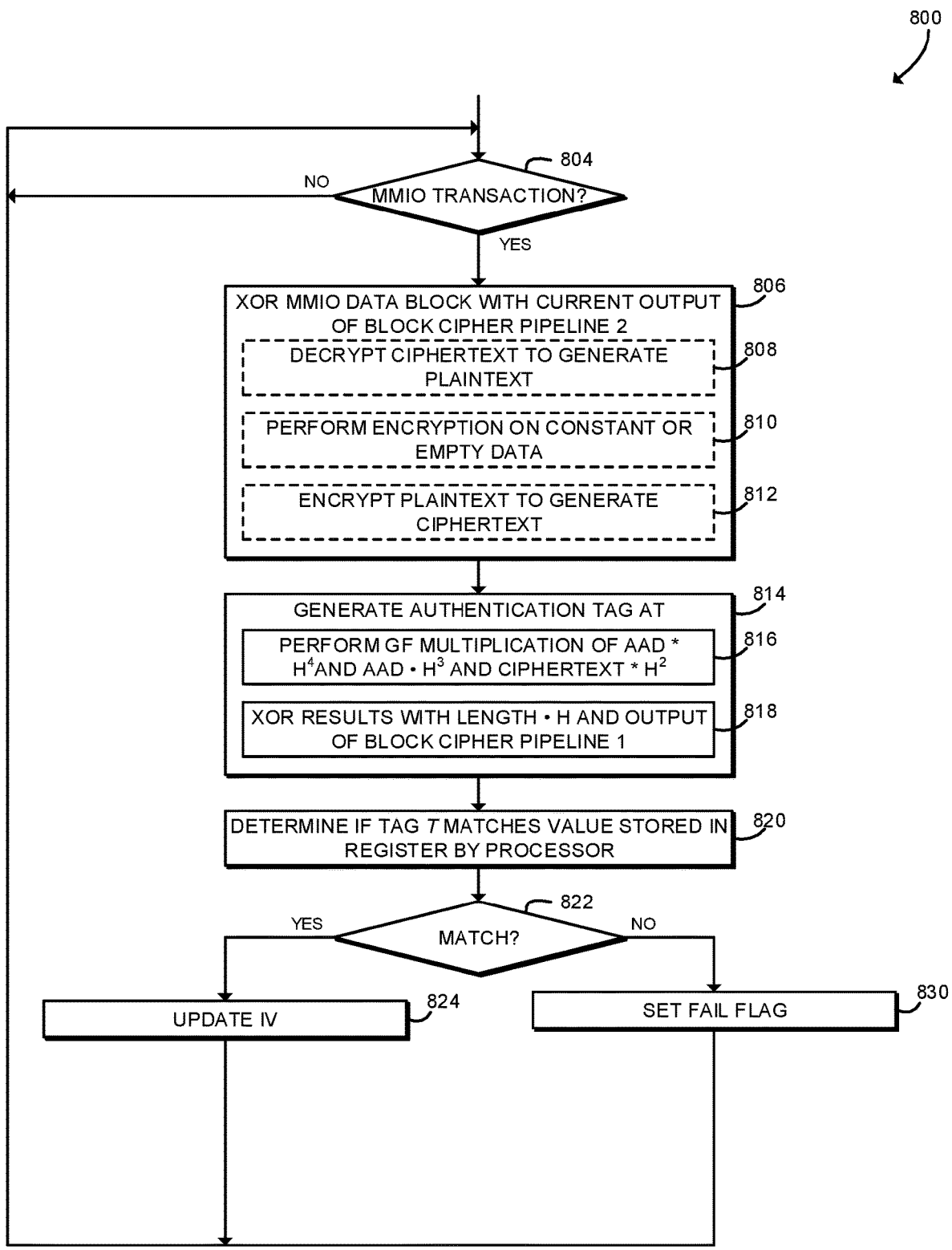
FIG. 8 is a flow diagram of MMIO transfer processing according to one or more embodiments.

FIG. 8 discloses a method 800 for performing secure MMIO transactions, including MMIO read requests, MMIO write requests, and/or MMIO read responses. It should be appreciated that, in some embodiments, the operations of method 800 may be performed by one or more components of computing environment 300 of computing device 100 as shown in FIG. 3, such as MIMO security engine 140. The method begins in block 804, where MMIO security engine 140 determines whether an MMIO transaction has been received. The MMIO transaction may be an MMIO read request, an MMIO write request, or an MMIO read response. MMIO read requests and MMIO write requests may be received from processor 120, and MMIO read responses may be received from accelerator 136. Additionally or alternatively, as described above, in some embodiments separate MMIO security engines 140 may receive MMIO requests (MMIO read requests and MMIO write requests) and MMIO read responses, respectively. If no MMIO transaction was received, method 800 loops back to block 804 to continue waiting for MMIO transactions. If an MMIO transaction is received, then the method 800 advances to block 806.

In block 806, the MMIO security engine 140 bitwise exclusive ORs (XOR, or the symbol ⊕) the input data block with the current output of 64-bit block cipher pipeline 2 406 (pipeline 2). The input data block may be 32 bits or 64 bits in length. Thus, XORing the output of the 64-bit block cipher pipeline 2 406 with the input data performs a cryptographic operation on the input data. In some embodiments, in block 808 MMIO security engine 140 decrypts ciphertext C data 412 to generate plaintext P data 408, for example when processing an MMIO write request from the processor. In that example, the MMIO security engine 140 calculates P=C⊕406. In some embodiments, in block 810 MMIO security engine 140 performs an encryption operation with a predetermined constant ciphertext C or an empty ciphertext C, for example when processing an MMIO read request from the processor. The predetermined ciphertext C may be, for example, a block of data with each bit set to zero. In that example, the MMIO read request does not include a data payload, and thus the cryptographic operation may be performed to facilitate generation of the authentication tag (AT) 446. In some embodiments, in block 812 MMIO security engine 140 encrypts plaintext P data 408 to generate ciphertext C data 412, for example when processing an MMIO read response from accelerator 136. In that example, MMIO security engine 140 calculates C=P⊕406.

In block 814, MMIO security engine 140 generates a final authentication tag (AT) 446 for the MMIO transaction. The generation of final AT 446 is performed according to Equation 1 described above. In block 816, MMIO security engine 140 performs GF multiplications of $AAD_{127-64} \cdot H^4$ and $AAD_{63} H^3$ and ciphertext C data $412 \cdot H^2$ using three GFMs 428, 434, 438, respectively. In an embodiment, the processing of GFMs 428, 434, and 438 are performed simultaneously in parallel. In an embodiment, the processing of GFMs 428, 434, and 438, 64-bit block cipher pipeline 1 416 and 64-bit block cipher pipeline 2 406 are performed simultaneously in parallel. As described above, in some embodiments the ciphertext C data may be a predetermined constant value (e.g., a zero block) for MMIO read requests or other transactions that do not include a data payload. In block 818, the MMIO security engine 140 performs a bitwise XOR of the results of the GF multiplications as well as the precomputed value of Length·H and the output of 64-bit block cipher pipeline 1 416 that encrypted counter 414. As described above, the length of MMIO transactions is known, and thus the value Length·H may be precomputed during initialization. Because the value Length·H is precomputed, using three GFMs 428, 434, 438 in parallel allow the operations of AT 446 equation to be completed in one clock cycle. Thus, when input data is received during a clock cycle, the ciphertext data 412/plaintext data 408 and the AT 446/502 are generated in the following clock cycle.

In block 820, MMIO security engine 140 determines whether the final AT value 446 matches an AT value stored in a register by processor 120 before the MMIO transaction. As described above in connection with FIG. 7, the processor may write the expected AT value before issuing an MMIO write request or an MMIO read request. If the final AT value does not match the expected AT value, then an error or attempted attack (e.g., attempted splicing attack or DoS attack) may have occurred. For example, writes to the AT register and MMIO transaction requests may be non-atomic, which may allow an attacker to write an incorrect value to the AT register and/or send a false MMIO request. In those circumstances, the AT values would not match, indicating a potential attack. As another example, a malicious actor may submit an improper MMIO transaction request (e.g., an MMIO transaction request with an incorrect AT). In block 822, MMIO security engine 140 checks whether the AT values match. If not, the method 800 branches to block 830, described below. If the AT values match, the method 800 branches to block 824. It should be understood that for MMIO read responses generated by accelerator 136, processor 120 does not write an expected AT value and thus the MMIO security engine 140 may not check AT values. If no AT check is performed, the method 800 advances to block 824.

In block 824, MMIO security engine 140 updates the IV. For a blocked session of multiple MMIO transactions, the value for IV may be incremented for each MMIO transaction. Method 800 loops back to block 804 to process additional MMIO transactions.

Referring back to block 822, if the AT value written by the processor and the final AT value generated by the MMIO security engine 140 do not match, the method branches to block 830, in which the MMIO security engine sets the fail flag. In response to a mismatch, MMIO security engine 140 may drop packets or otherwise prevent the MMIO transaction from reaching accelerator 136. Thus, MMIO security engine 140 may prevent splicing or spoofing attacks and other improperly formed MMIO requests. For a mismatched MMIO read request, MMIO security engine 140 may send an arbitrary MMIO read response and store a poisoned AT (e.g., a mismatched AT or other AT that indicates failure) that may allow the processor to detect the authentication failure. Additionally or alternatively, storing a poisoned AT may not be necessary if the processor checks the fail flag for success of the MMIO read request. Note that in the case of an AT mismatch, MIMIO security engine 140 does not update the IV. Thus, the state of secure MMIO security engine 140 is unchanged, and processor 120 (e.g., trusted execution environment 302) and the MMIO security engine remain synchronized for future MMIO transactions. Accordingly, by avoiding the need to re-synchronize after an incorrect AT and/or MMIO transaction, the MMIO security engine prevents certain denial-of-service (DoS) attacks without additional performance overhead. After setting the fail flag, method 800 loops back to block 804 in which secure MMIO security engine 140 processes additional MMIO transactions.

It should be appreciated that, in some embodiments, the methods 600, 700, and/or 800 are embodied as various instructions stored on a computer-readable media, which are executed by processor 120, I/O subsystem 124, MMIO security engine 140, accelerator 136, and/or other components of computing device 100 to cause the computing device to perform the respective method 600, 700, and/or 800. The computer-readable media may be embodied as any type of media capable of being read by computing device 100 including, but not limited to, memory 130, data storage device 132, firmware devices, other memory or data storage devices of the computing device, portable media readable by a peripheral device 142 of the computing device, and/or other media.

The following examples pertain to further embodiments.

Example 1 is an apparatus including a first block cipher pipeline to encrypt a count using a key; a first exclusive-OR (XOR) to generate a first XOR result of the encrypted count and a length multiplied by an authentication key; a second block cipher pipeline to encrypt (count+1) using the key; a second XOR to generate a second XOR result of plaintext data and the encrypted (count+1); a first Galois field multiplier (GFM) to perform Galois field multiplication on a first portion of additional authenticated data (AAD) and a fourth power of the authentication key; a second GFM to perform Galois field multiplication on a second portion of the AAD and a third power of the authentication key; a third XOR to generate a third XOR result of output data from the first GFM and output data from the second GFM; a third GFM to perform Galois field multiplication on the second XOR result and a second power of the authentication key; a fourth XOR to generate a fourth XOR result of output data from the third GFM and the third XOR result; and a fifth XOR to generate an authentication tag of the first XOR result and the fourth XOR result.

In Example 2, the subject matter of Example 1 can optionally include wherein the second XOR result comprises ciphertext data resulting from encrypting the plaintext data with the key.

In Example 3 the subject matter of Example 2 can optionally include wherein the apparatus generates the ciphertext data and the authentication tag in one clock cycle with no buffering of plaintext data.

In Example 4 the subject matter of Example 2 can optionally include wherein the plaintext data, the ciphertext data, and the authentication tag comprise 64 bits.

In Example 5 the subject matter of Example 2 can optionally include wherein the first portion of the AAD comprises bits 127 to 64 and the second portion of the AAD comprises bits 63 to 0.

In Example 6 the subject matter of Example 2 can optionally include wherein the first block cipher pipeline and the second block cipher pipeline comprise PRINCE block ciphers, SIMON block ciphers, SPECK bloc ciphers, or PRESENT block ciphers.

Example 7 is an apparatus including a first block cipher pipeline to encrypt a count using a key; a first exclusive-OR (XOR) to generate a first XOR result of the encrypted count and a length multiplied by an authentication key; a second block cipher pipeline to encrypt (count+1) using the key; a second XOR to generate a second XOR result of ciphertext data and the encrypted (count+1); a first Galois field multiplier (GFM) to perform Galois field multiplication on a first portion of additional authenticated data (AAD) and a fourth power of the authentication key; a second GFM to perform Galois field multiplication on a second portion of the AAD and a third power of the authentication key; a third XOR to generate a third XOR result of output data from the first GFM and output data from the second GFM; a third GFM to perform Galois field multiplication on the ciphertext data and a second power of the authentication key; a fourth XOR to generate a fourth XOR result of output data from the third GFM and the third XOR result; and a fifth XOR to generate an authentication tag of the first XOR result and the fourth XOR result.

In Example 8 the subject matter of Example 7 can optionally include wherein the second XOR result comprises plaintext data resulting from decrypting the plaintext data with the key.

In Example 9 the subject matter of Example 8 can optionally include wherein the apparatus generates the plaintext data and the authentication tag in one clock cycle with no buffering of ciphertext data.

Example 10 is a method including the steps of encrypting a count using a key by a first block cipher pipeline; generating a first exclusive-OR (XOR) result of the encrypted count and a length multiplied by an authentication key; encrypting (count+1) using the key by a second block cipher pipeline; generating a second XOR result of plaintext data and the encrypted (count+1); performing a first Galois field multiplication (GFM) on a first portion of additional authenticated data (AAD) and a fourth power of the authentication key; performing a second Galois field multiplication on a second portion of the AAD and a third power of the authentication key; generating a third XOR result of output data from the first GFM and output data from the second GFM; performing a third Galois field multiplication on the second XOR result and a second power of the authentication key; generating a fourth XOR result of output data from the third GFM and the third XOR result; and generating an authentication tag of the first XOR result and the fourth XOR result.

In Example 11 the subject matter of Example 10 can optionally include wherein the second XOR result comprises ciphertext data resulting from encrypting the plaintext data with the key.

In Example 12 the subject matter of Example 11 can optionally include wherein generating the ciphertext data and generating the authentication tag are performed in one clock cycle with no buffering of plaintext data.

In Example 13 the subject matter of Example 11 can optionally include wherein the plaintext data, the ciphertext data, and the authentication tag comprise 64 bits.

In Example 14 the subject matter of Example 11 can optionally include wherein the first portion of the AAD comprises bits 127 to 64 and the second portion of the AAD comprises bits 63 to 0.

In Example 15 the subject matter of Example 11 can optionally include wherein the first block cipher pipeline and the second block cipher pipeline comprise PRINCE block ciphers, SIMON block ciphers, SPECK bloc ciphers, or PRESENT block ciphers.

In Example 16 the subject matter of Example 11 can optionally include performing the first GFM, the second GFM, and the third GFM simultaneously in parallel.

In Example 17 the subject matter of Example 11 can optionally include performing the first GFM, the second GFM, the third GFM, encrypting the count, and encrypting (count+1) simultaneously in parallel.

Example 18 is a method including the steps of encrypting a count using a key by a first block cipher pipeline; generating a first exclusive-OR (XOR) result of the encrypted count and a length multiplied by an authentication key; encrypting (count+1) using the key by a second block cipher pipeline; generating a second XOR result of ciphertext data and the encrypted (count+1); performing a first Galois field multiplication (GFM) on a first portion of additional authenticated data (AAD) and a fourth power of the authentication key; performing a second Galois field multiplication on a second portion of the AAD and a third power of the authentication key; generating a third XOR result of output data from the first GFM and output data from the second GFM; performing a third Galois field multiplication on the ciphertext data and a second power of the authentication key; generating a fourth XOR result of output data from the third GFM and the third XOR result; and generating an authentication tag of the first XOR result and the fourth XOR result.

In Example 19 the subject matter of Example 18 can optionally include wherein the second XOR result comprises plaintext data resulting from decrypting the ciphertext data with the key.

In Example 20 the subject matter of Example 19 can optionally include wherein generating the plaintext data and generating the authentication tag are performed in one clock cycle with no buffering of ciphertext data.

Example 21 is an apparatus including means for encrypting a count using a key by a first block cipher pipeline; means for generating a first exclusive-OR (XOR) result of the encrypted count and a length multiplied by an authentication key; means for encrypting (count+1) using the key by a second block cipher pipeline; means for generating a second XOR result of plaintext data and the encrypted (count+1); means for performing a first Galois field multiplication (GFM) on a first portion of additional authenticated data (AAD) and a fourth power of the authentication key; means for performing a second Galois field multiplication on a second portion of the AAD and a third power of the authentication key; means for generating a third XOR result of output data from the first GFM and output data from the second GFM; means for performing a third Galois field multiplication on the second XOR result and a second power of the authentication key; means for generating a fourth XOR result of output data from the third GFM and the third XOR result; and means for generating an authentication tag of the first XOR result and the fourth XOR result.

Example 22 is an apparatus including means for encrypting a count using a key by a first block cipher pipeline; means for generating a first exclusive-OR (XOR) result of the encrypted count and a length multiplied by an authentication key; means for encrypting (count+1) using the key by a second block cipher pipeline; means for generating a second XOR result of ciphertext data and the encrypted (count+1); means for performing a first Galois field multiplication (GFM) on a first portion of additional authenticated data (AAD) and a fourth power of the authentication key; means for performing a second Galois field multiplication on a second portion of the AAD and a third power of the authentication key; means for generating a third XOR result of output data from the first GFM and output data from the second GFM; performing a third Galois field multiplication on the ciphertext data and a second power of the authentication key; means for generating a fourth XOR result of output data from the third GFM and the third XOR result; and means for generating an authentication tag of the first XOR result and the fourth XOR result.

The invention claimed is:

1. An apparatus comprising:
a first block cipher pipeline circuit to encrypt a count using a key;
a first exclusive-OR (XOR) circuit to generate a first XOR result of the encrypted count and a length multiplied by an authentication key;
a second block cipher pipeline circuit to encrypt (count+1) using the key;
a second XOR circuit to generate a second XOR result of plaintext data and the encrypted (count+1);
a first Galois field multiplier (GFM) circuit to perform Galois field multiplication on a first portion of additional authenticated data (AAD) and a fourth power of the authentication key;
a second GFM circuit to perform Galois field multiplication on a second portion of the AAD and a third power of the authentication key;
a third XOR circuit to generate a third XOR result of output data from the first GFM and output data from the second GFM;
a third GFM circuit to perform Galois field multiplication on the second XOR result and a second power of the authentication key;
a fourth XOR circuit to generate a fourth XOR result of output data from the third GFM and the third XOR result; and
a fifth XOR circuit to generate an authentication tag of the first XOR result and the fourth XOR result.

2. The apparatus of claim 1, wherein the second XOR result comprises ciphertext data resulting from encrypting the plaintext data with the key.

3. The apparatus of claim 2, wherein the apparatus generates the ciphertext data and the authentication tag in one clock cycle with no buffering of plaintext data.

4. The apparatus of claim 2, wherein the plaintext data, the ciphertext data, and the authentication tag comprise 64 bits.

5. The apparatus of claim 2, wherein the first portion of the AAD comprises bits 127 to 64 and the second portion of the AAD comprises bits 63 to 0.

6. The apparatus of claim 2, wherein the first block cipher pipeline circuit and the second block cipher pipeline circuit comprise PRINCE block cipher circuits, SIMON block cipher circuits, SPECK block cipher circuits, or PRESENT block cipher circuits.

7. An apparatus comprising:
a first block cipher pipeline circuit to encrypt a count using a key;
a first exclusive-OR (XOR) circuit to generate a first XOR result of the encrypted count and a length multiplied by an authentication key;
a second block cipher pipeline circuit to encrypt (count+1) using the key;
a second XOR circuit to generate a second XOR result of ciphertext data and the encrypted (count+1);
a first Galois field multiplier (GFM) circuit to perform Galois field multiplication on a first portion of additional authenticated data (AAD) and a fourth power of the authentication key;
a second GFM circuit to perform Galois field multiplication on a second portion of the AAD and a third power of the authentication key;
a third XOR circuit to generate a third XOR result of output data from the first GFM and output data from the second GFM;
a third GFM circuit to perform Galois field multiplication on the ciphertext data and a second power of the authentication key;
a fourth XOR circuit to generate a fourth XOR result of output data from the third GFM and the third XOR result; and
a fifth XOR circuit to generate an authentication tag of the first XOR result and the fourth XOR result.

8. The apparatus of claim 7, wherein the second XOR result comprises plaintext data resulting from decrypting the ciphertext data with the key.

9. The apparatus of claim 8, wherein the apparatus generates the plaintext data and the authentication tag in one clock cycle with no buffering of ciphertext data.

10. A method comprising:
encrypting a count using a key by a first block cipher pipeline circuit;
generating a first exclusive-OR (XOR) result of the encrypted count and a length multiplied by an authentication key by a first XOR circuit;
encrypting (count+1) using the key by a second block cipher pipeline circuit;
generating a second XOR result of plaintext data and the encrypted (count+1) by a second XOR circuit;
performing a first Galois field multiplication (GFM) on a first portion of additional authenticated data (AAD) and a fourth power of the authentication key by a first GFM circuit;
performing a second Galois field multiplication on a second portion of the AAD and a third power of the authentication key by a second GFM circuit;
generating a third XOR result of output data from the first GFM and output data from the second GFM by a third XOR circuit;
performing a third Galois field multiplication on the second XOR result and a second power of the authentication key by a third GFM circuit;
generating a fourth XOR result of output data from the third GFM circuit and the third XOR result by a fourth XOR circuit; and
generating an authentication tag of the first XOR result and the fourth XOR result by a fifth XOR circuit.

11. The method of claim 10, wherein the second XOR result comprises ciphertext data resulting from encrypting the plaintext data with the key.

12. The method of claim 11, wherein generating the ciphertext data and generating the authentication tag are performed in one clock cycle with no buffering of plaintext data.

13. The method of claim 11, wherein the plaintext data, the ciphertext data, and the authentication tag comprise 64 bits.

14. The method of claim 11, wherein the first portion of the AAD comprises bits 127 to 64 and the second portion of the AAD comprises bits 63 to 0.

15. The method of claim 11, wherein the first block cipher pipeline circuit and the second block cipher pipeline circuit comprise PRINCE block cipher circuits, SIMON block cipher circuits, SPECK block cipher circuits, or PRESENT block cipher circuits.

16. The method of claim 11, comprising performing the first GFM, the second GFM, and the third GFM simultaneously in parallel.

17. The method of claim 11, comprising performing the first GFM, the second GFM, the third GFM, encrypting the count, and encrypting (count+1) simultaneously in parallel.

18. A method comprising:
encrypting a count using a key by a first block cipher pipeline circuit;
generating a first exclusive-OR (XOR) result of the encrypted count and a length multiplied by an authentication key by a first XOR circuit;
encrypting (count+1) using the key by a second block cipher pipeline circuit;
generating a second XOR result of ciphertext data and the encrypted (count+1) by a second XOR circuit;
performing a first Galois field multiplication (GFM) on a first portion of additional authenticated data (AAD) and a fourth power of the authentication key by a first GFM circuit;
performing a second Galois field multiplication on a second portion of the AAD and a third power of the authentication key by a second GFM circuit;
generating a third XOR result of output data from the first GFM and output data from the second GFM by a third XOR circuit;
performing a third Galois field multiplication on the ciphertext data and a second power of the authentication key by a third GFM circuit;
generating a fourth XOR result of output data from the third GFM and the third XOR result by a fourth XOR circuit; and
generating an authentication tag of the first XOR result and the fourth XOR result by a fifth XOR circuit.

19. The method of claim 18, wherein the second XOR result comprises plaintext data resulting from decrypting the ciphertext data with the key.

20. The method of claim 19, wherein generating the plaintext data and generating the authentication tag are performed in one clock cycle with no buffering of ciphertext data.

* * * * *